United States Patent [19]
Yamanaka

[11] Patent Number: 6,058,803
[45] Date of Patent: *May 9, 2000

[54] HOLLOW BICYCLE CRANK AND METHOD FOR MANUFACTURING SAME

[75] Inventor: Masahiro Yamanaka, Izumisano, Japan

[73] Assignee: Shimano, Inc., Osaka, Japan

[ * ] Notice: This patent is subject to a terminal disclaimer.

[21] Appl. No.: 08/993,448

[22] Filed: Dec. 18, 1997

[30] Foreign Application Priority Data

Dec. 27, 1996 [JP] Japan ................................ 8-358088

[51] Int. Cl.⁷ .................................................. G05G 1/14
[52] U.S. Cl. ........................ 74/594.1; 29/897.2; D12/123; 280/259
[58] Field of Search .............................. 164/137; 29/897.2; 74/594.1–594.6; D12/123; 280/259

[56] References Cited

U.S. PATENT DOCUMENTS

| D. 21,059 | 9/1891 | Willis ...................................... D12/123 |
| D. 265,812 | 8/1982 | Kastan .................................... D12/123 |
| D. 319,808 | 9/1991 | Cook ....................................... D12/123 |
| D. 356,526 | 3/1995 | Burns ...................................... D12/123 |
| D. 384,603 | 10/1997 | Chen ....................................... D12/123 |
| 5,125,288 | 6/1992 | Amiet ..................................... 74/594.1 |
| 5,179,873 | 1/1993 | Girvin ..................................... 74/594.1 |
| 5,197,353 | 3/1993 | Trenerry et al. ........................ 74/594.1 |
| 5,904,072 | 5/1999 | Yamanaka .............................. 74/594.2 |

FOREIGN PATENT DOCUMENTS

| 270388 A1 | 6/1988 | European Pat. Off. .............. 74/594.1 |
| 48-7948 | 1/1973 | Japan . |
| 58-93554 | 6/1983 | Japan .............................. B22D 17/22 |
| 60-13761 | 9/1985 | Japan .............................. B62M 3/00 |
| 61-131391 | 8/1986 | Japan .............................. B62M 3/00 |
| 61-150691 | 9/1986 | Japan .............................. B62M 3/00 |
| 2-18652 | 4/1990 | Japan .............................. B21D 53/86 |
| 5-116670 | 5/1993 | Japan .............................. B62M 3/00 |

OTHER PUBLICATIONS

Patent Abstracts of Japan, vol. 7, No. 193, Aug. 24, 1983; for JP 58–093554 A (Arai), published Jun. 3, 1983.

*Primary Examiner*—Vinh T. Luong
*Attorney, Agent, or Firm*—James A. Deland

[57] ABSTRACT

A crank arm for a bicycle includes a crank arm body having a pedal attachment hole on a first end thereof and a spindle attachment hole on a second end thereof. The crank arm body defines an elongated interior cavity, wherein the interior cavity is open to an exterior of the crank arm body. The opening can be used to access the cavity during and after manufacturing. In the method used to form the crank arm body according to the present invention, a sand mold core is positioned into a casting mold so that a melt space is formed around the sand mold core, molten metal is poured into the casting mold, and the molten metal is solidified to form a crank billet. Sand is preferably removed through an opening in the crank billet. This may be accomplished by drilling the crank billet to form the pedal attachment hole in a location that communicates with the sand mold and then removing sand through the pedal attachment hole.

7 Claims, 5 Drawing Sheets

1

HOLLOW BICYCLE CRANK AND METHOD FOR MANUFACTURING SAME

BACKGROUND OF THE INVENTION

The present invention is directed to bicycle crank arms and, more particularly, to a hollow bicycle crank arm that uses a removable sand mold during casting.

It is desirable for a bicycle to be as lightweight as possible, so the bicycle parts should be reduced in weight as much as possible. This is true of bicycle cranks as well. A bicycle crank that is made lightweight by being manufactured in the form of a hollow tube is known from Japanese Patent Publication 2-18652, for example. Furthermore, a method for forming an internal cavity in a solid material by extrusion forging has also been proposed in Japanese Laid-Open Patent Application 5-11670. This hollow crank is obtained by the welding or plastic deformation of a pipe or crank billet, but this method affords little freedom in the design of the crank shape. The shape is further restricted because molding is impossible without certain portions that are otherwise unnecessary in terms of material dynamics, among other reasons. Another drawback is that a high quality appearance is difficult to achieve because of limitations in the machining process, despite demand for certain types of designs.

Methods for manufacturing a bicycle crank from a light alloy by casting are also known from Japanese Laid-Open Patent Application 58-93554. The shape restrictions noted above are eliminated with these casting methods, but forming a cavity on the inside is difficult with a crank because of the small size of the part, and the hollow interior can degrade the mechanical strength of the product. Accordingly, it has been proposed that a pipe or the like be integrally cast in the interior as shown in Japanese Laid-Open Utility Model Applications 48-7948 and 61-131391. Integrally embedding a pipe or other such member with high strength in the crank does indeed preserve the strength of the crank, but a problem remains in terms of making the product lightweight.

SUMMARY OF THE INVENTION

The present invention is directed to a hollow bicycle crank that can be manufactured by casting while providing substantial design freedom. Such a crank can be lightweight while also being strong. In one embodiment of a bicycle crank according to the present invention, a crank arm for a bicycle includes a crank arm body having a pedal attachment hole on a first end thereof and a spindle attachment hole on a second end thereof. The crank arm body defines an elongated interior cavity, wherein the interior cavity is open to an exterior of the crank arm body. The opening can be used to access the cavity during and after manufacturing. The shape of the cavity may be varied to produce a lightweight yet strong structure. For example, the interior cavity may have a substantially semicircular cross sectional shape in proximity to the spindle attachment hole and a substantially rectangular shape in proximity to the pedal attachment hole, and a cross sectional diameter of the cavity may decrease from a central portion of the crank arm body to the first and second ends of the crank arm body.

In one embodiment of the method used to form the crank arm body according to the present invention, a sand mold core is positioned into a casting mold so that a melt space is formed around the sand mold core, molten metal is poured into the casting mold, and the molten metal is solidified to form a crank billet. Sand is preferably removed through an opening in the crank billet. This may be accomplished by drilling the crank billet to form the pedal attachment hole in a location that communicates with the sand mold and then removing sand through the pedal attachment hole.

DETAILED DESCRIPTION OF THE EMBODIMENTS

Figure 1:
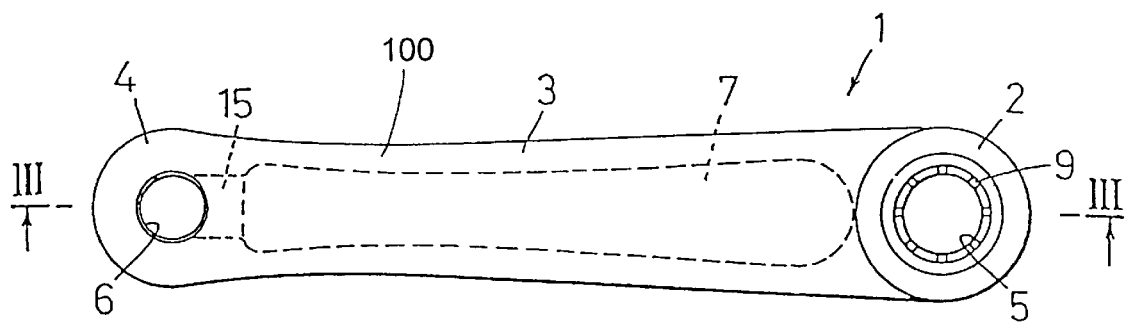
FIG. 1 is a rear view of a particular embodiment of a bicycle crank according to the present invention.
Figure 2:
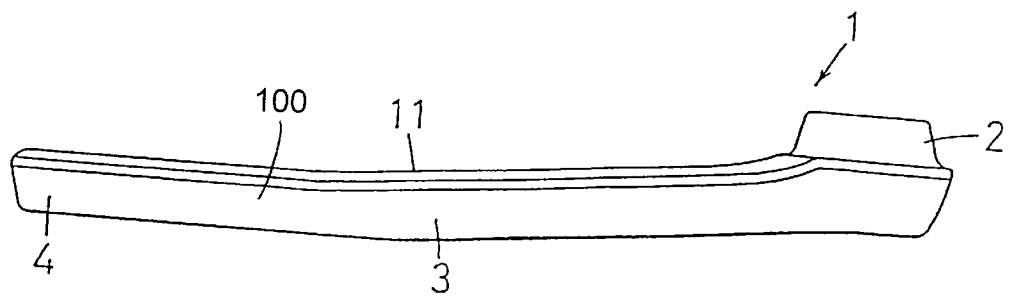
FIG. 2 is a side view of the bicycle crank shown in FIG. 1.

FIG. 1 is a rear view of a particular embodiment of a left side bicycle crank 1 according to the present invention. Left crank 1 has a crank arm body 100 with a center section 3, a crank spindle end 2 and a pedal spindle end 4. The left crank 1 is made from an aluminum alloy and, as shown in FIG. 1, is formed such that its cross section is narrower on the pedal spindle end 4 side where the pedal spindle (not shown) is attached and thicker on the crank spindle end 2 side where the crank spindle (not shown) is attached. Thus changing the cross sectional area by varying the thickness of the left crank 1 in different locations is intended to enhance strength such that the stress to which the left crank is subjected is more or less the same everywhere in the cross section. A chamfered section 11 (see FIG. 2) is formed along both edges on the back side of the left crank 1.

A pedal attachment hole 6 for attachment of a pedal spindle (not shown) is formed in the pedal spindle end 4 on the pedal attachment side of the left crank 1. A crank spindle attachment hole 5 for attaching the left crank 1 to the crank spindle by inserting the spindle into the crank spindle attachment hole 5 is formed at the crank spindle end 2 of the left crank 1. More specifically, a flange 8 protrudes inward from the inner surface of the crank spindle attachment hole 5, and a male serration 9 is provided integrally on the, rear surface side of this flange 8. In this example, the serration 9 has eight teeth, as shown in FIG. 1. If there are too few teeth, the strength of the rotational bond will be inadequate. On the other hand, if there are too many teeth the machining will be difficult, the cost will be higher, and there will be a higher incidence of errors in the positioning of indexing in the rotational direction during assembly.

The portion of the crank spindle attachment hole 5 to the rear of the serration 9 is structured as a centering component (also called a guide component) 10 that is a concentrically tapered hole. The centering component 10 is in the form of a cylindrical tapered hole that widens to the rear, and, in this example, it is formed at a taper angle of 2° to 3°. The taper surface of the centering component 10 is snugged up against the taper surface of the centering component of the crank spindle (not shown), which accurately aligns the two centers and also links them together integrally and securely.

As shown in FIGS. 1, 3 and 5(a)–(d), a cavity 7 is formed along the pedal spindle end 4 side and the crank spindle end 2 side centering on the crank center 3, wherein the cross sectional structure of the cavity 7 is shown in FIGS. 5(a)–(d). The cross sectional area of the crank center 3 is designed such that all locations are subjected to essentially the same stress. More specifically, the cross sectional structure of the cavity 7 is such that the shape is semicircular on the crank spindle end 2 side, and this shape flattens out to a rectangular shape on the pedal spindle end 4 side. The cross sectional area of the cavity 7 continuously decreases, and the height is at a minimum at the two ends. In other words, the shape of the cavity 7 approximates that of a ship hull. The weight of the left crank 1 is reduced by the cavity 7 on the interior of the crank center 3.

Figure 3:
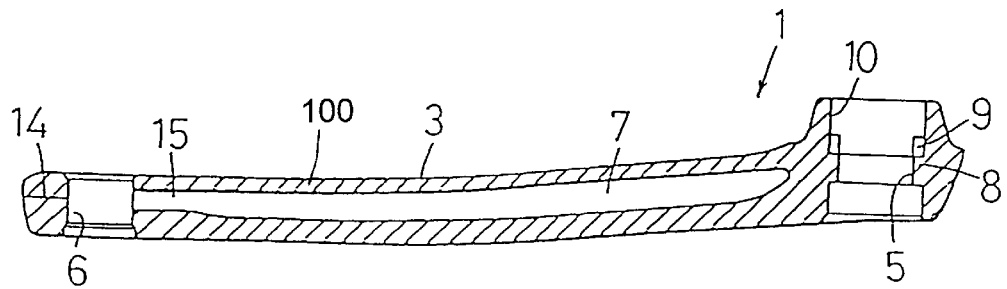
FIG. 3 is a cross sectional view of the bicycle crank taken along line III—III in FIG. 1.
Figure 4:
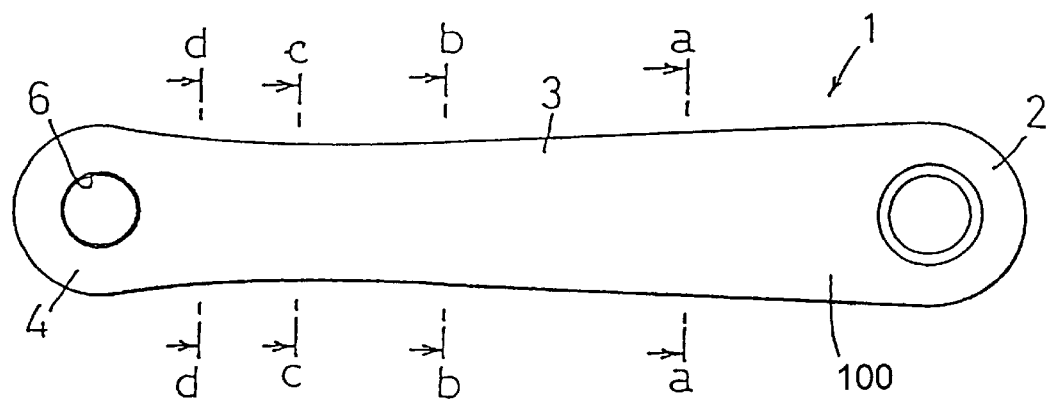
FIG. 4 is a front view of the bicycle crank shown in FIG. 1.
Figure 5A:
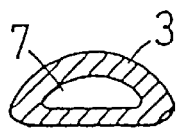
FIG. 5(a) is a view taken along line Va—Va in FIG. 4;.
Figure 5B:
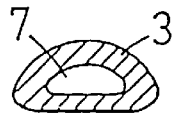
FIG. 5(b) is a view taken along line Vb—Vb in FIG. 4.
Figure 5C:
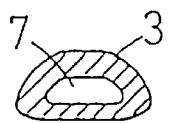
FIG. 5(c) is a view taken along line Vc—Vc in FIG. 4.
Figure 5D:
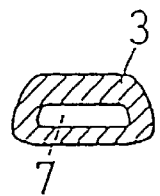
FIG. 5(d) is a view taken along line Vd—Vd in FIG. 4.

The cavity 7 communicates with the pedal attachment hole 6, and cavity 7 is furnished with an opening 15 having a flat cross section on the side surface of the pedal attachment hole 6. This opening 15, as will be discussed below, is used to take out the mold core sand. As shown in FIG. 3, a forged joint face 14 in which the opening 15 has been flattened out is formed in the cross section near the pedal attachment hole 6.

Method 1 for Manufacturing the Left Crank 1

Figure 6:
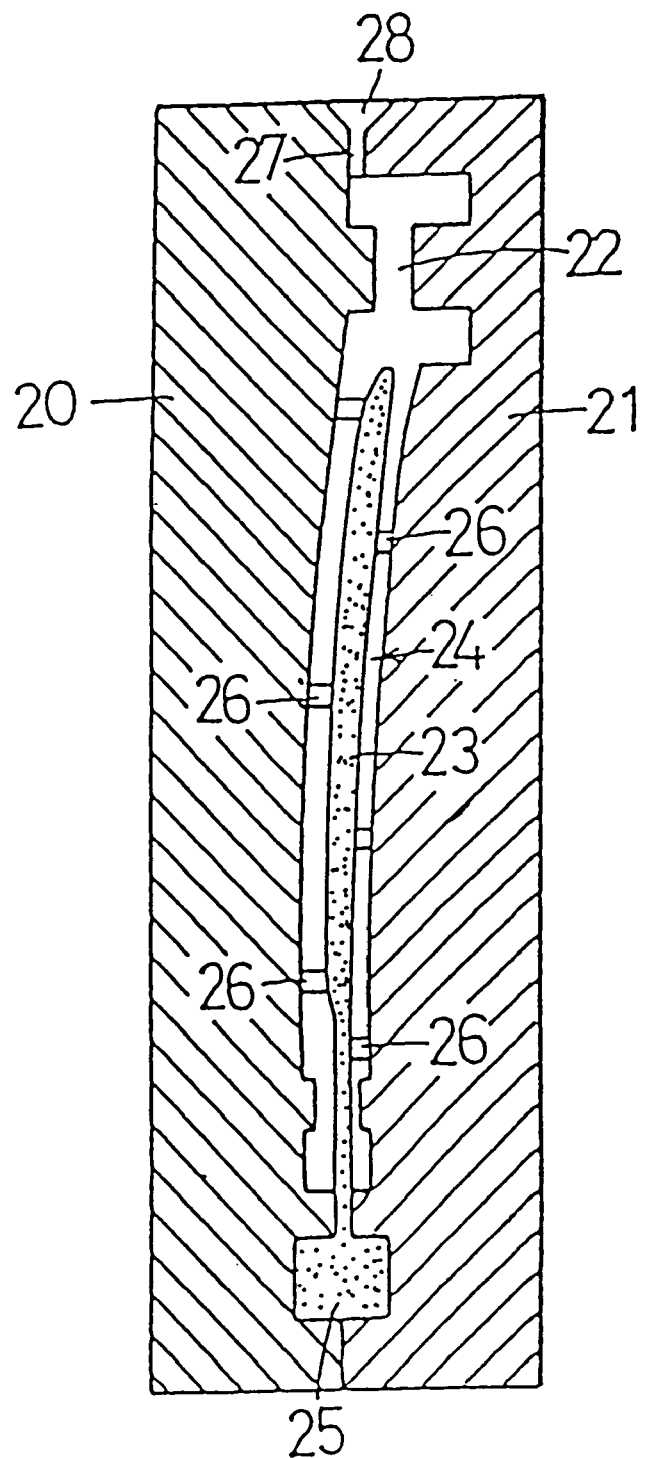
FIG. 6 is a cross sectional view of a particular embodiment of a casting mold used in the method of manufacturing a bicycle crank according to the present invention.

The left crank 1 may be manufactured by the following method. FIG. 6 is a cross sectional view of the molding apparatus during initial casting. A melt space 22, into which the molten metal is allowed to flow between the metal mold 20 and the metal mold 21, is demarcated within the metal mold 20 and the metal mold 21. The melt space 22 is demarcated in a shape roughly corresponding to the left crank 1, but the melt space 22 is slightly larger to accommodate the shrinkage of the molten metal.

A mold core 24 is inserted into the melt space 22, wherein the mold core 24 has roughly the same shape as the cavity 7 formed on the inside of the left crank 1. In this embodiment, the mold core 24 is recycled mold core-use sand, and the recycled sand is coated with a synthetic resin as a hardening material that serves to preserve the shape of the mold core. The mold core 24 consists of a cavity mold core component 23 that creates the cavity 7 of the left crank 1, and a mold core holder 25 that is embedded in the metal mold 20 and the metal mold 21 and is used to fix the mold core 24.

Figure 7:
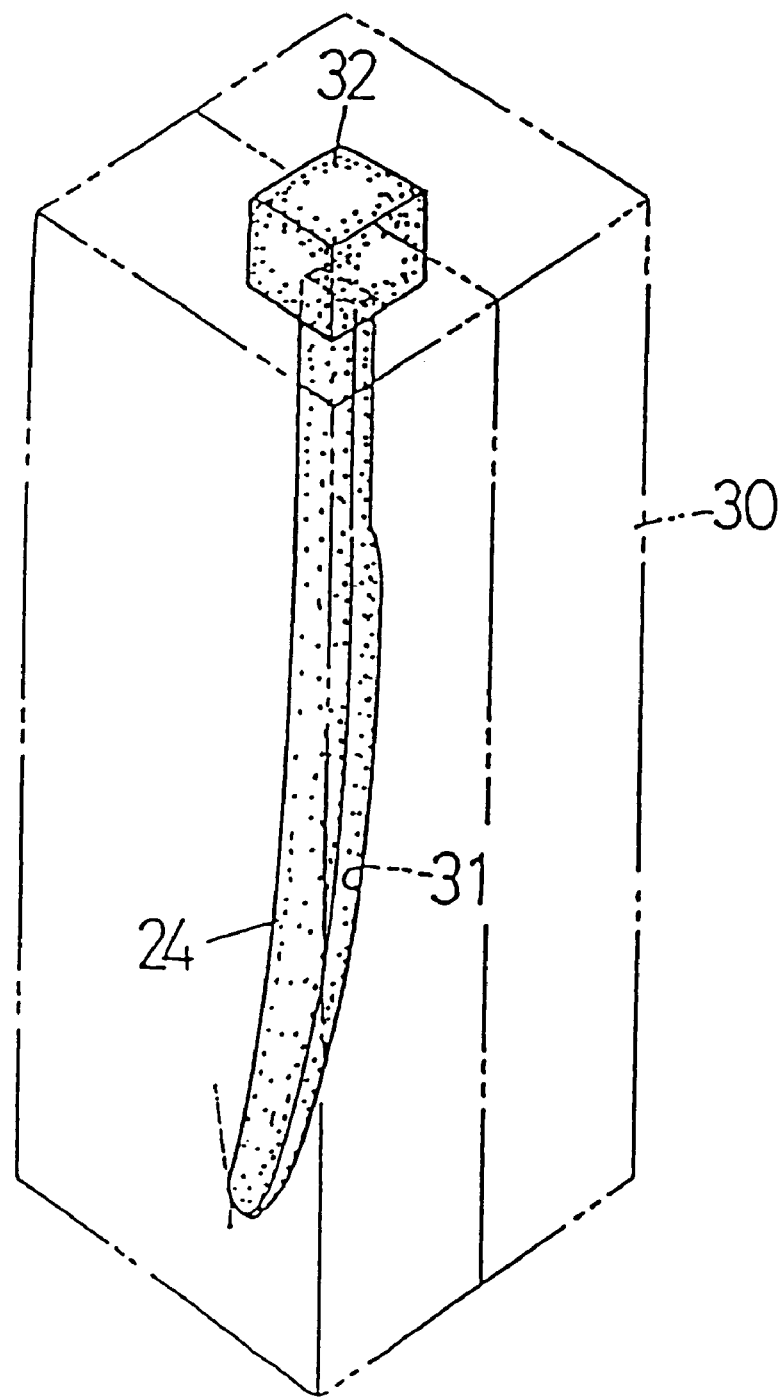
FIG. 7 is an oblique projection of a casting mold for the sand core used in the method of manufacturing the bicycle crank according to the present invention.

The mold core 24 is made by baking in a mold core mold 30 shown in FIG. 7. In this embodiment, mold core mold 30 is made from silicone rubber, and it is made in a mold that splits in two. On the inside of the mold core mold 30 is formed a space 31 that corresponds to the cavity mold core 24 and a space 32 that corresponds to the mold core holder 25. Mold core sand whose surface has been coated with a resin is poured into these spaces 31 and 32. The mold core sand is tamped down at a specific pressure, after which it is put into a baking furnace (not shown) along with the mold core mold 30, where it is heated to the hardening temperature of the resin. This heating thermosets the resin coating on the surface of the mold core sand, hardens the mold core sand within the mold core mold 30, and creates the mold core 24. Once the mold core 24 has hardened, the mold core mold 30 is split open and the mold core 24 is taken out from the spaces 31 and 32. After being taken out, the mold core 24 retains its hardened shape and does not readily crumble under light force.

The melt space 22 is formed within the metal mold 20 and the metal mold 21, and the mold core 24 is positioned within the melt space 22 as shown in FIG. 6. In order for the mold core 24 to be accurately positioned within the melt space 22, spacers made from foamed styrene or the like are used to position the mold core 24. The melt space 22 communicates with a sprue 28 via a runner 27. A molten aluminum alloy is then poured into the sprue 28, goes through the runner 27, and enters the melt space 22. This casting method is called a metal mold gravity casting, in which ordinary casting is performed using only gravitational pressure without any additional.

Figure 8:
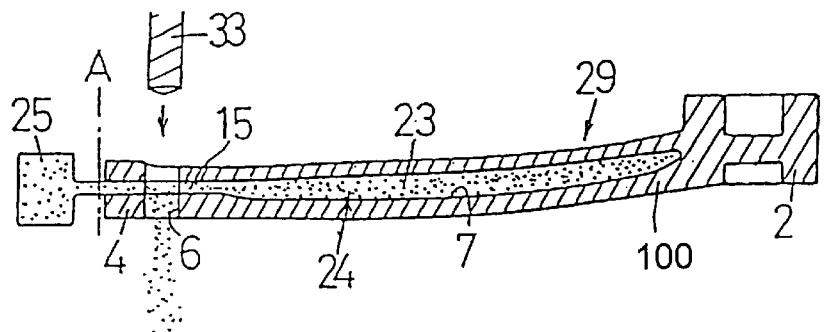
FIG. 8 is a cross sectional view of a crank billet according to the present invention after casting.

FIG. 8 is a cross sectional view of the crank billet 29 after being taken out of the metal mold 20 and the metal mold 21 after casting. The mold core holder 25 is cut off at location A, and the lower hole in the pedal attachment hole 6 is made with a drill 33. Since this machining causes an exterior of crank arm body 100 such as the pedal attachment hole 6 to communicate with the opening 15, the mold core sand can be taken out from the opening 15, thus forming the cavity 7. After this, the casting is finished to the required left crank 1 shape by cutting, grinding, polishing, or other such machining.

Method 2 for Manufacturing the Left Crank 1

The above method for manufacturing the left crank 1 involved finishing the casting to the required shape by cutting, grinding, polishing, or other such machining. However, with casting alone, blowholes and the like can occur in the metal texture in the interior. To prevent this from occurring, the crank billet may be subjected to mold forging while the mold core 24 is still inside the crank billet 29.

Figure 9:
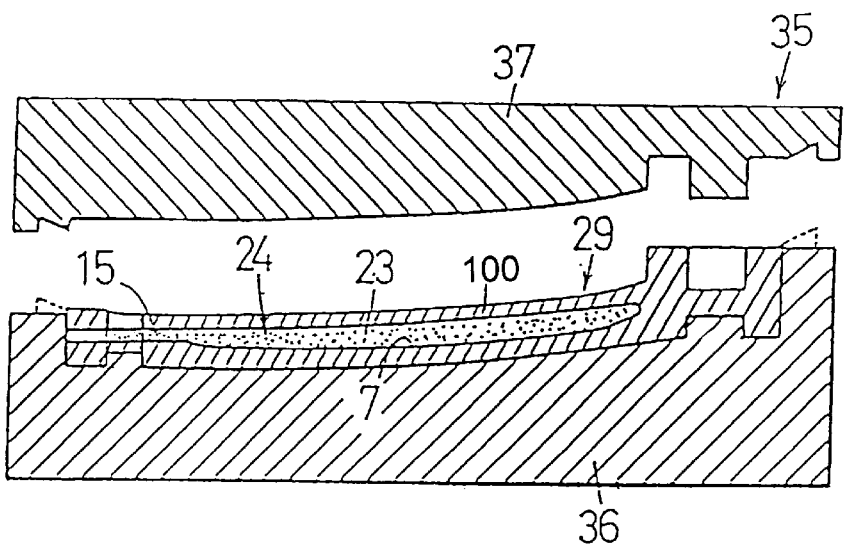
FIG. 9 is a cross sectional view of the crank billet being placed in a forging mold.

More specifically, the crank billet 29 is placed in a semi-closed metal mold 35 that is used for semi-closed forging, and is hot forged therein. FIG. 9 is a cross sectional view showing the crank billet 29 disposed in a lower metal mold 36. Before the crank billet 29 is placed in the lower metal mold 36, the mold core sand is removed only from the vicinity of the opening 15 in the pedal attachment hole 6. The reason for this is that this portion will become weaker if the mold core sand remains, and the mechanical strength of the pedal attachment hole 6 will suffer.

Figure 10:
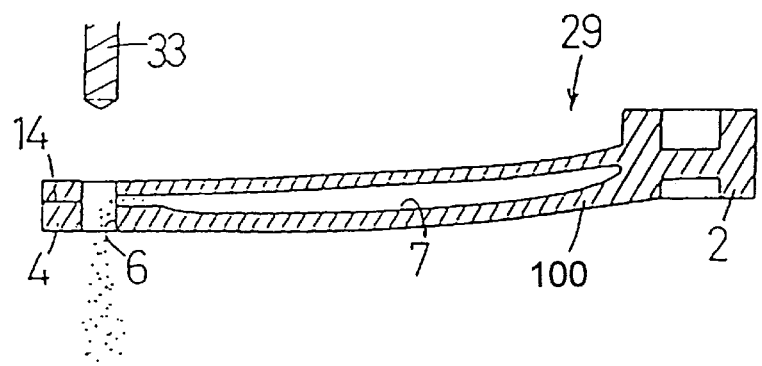
FIG. 10 is a cross sectional view of the crank billet after forging.

The opening 15 in the distal end of the pedal attachment hole 6 is flattened out to form a solid section as shown in FIG. 10. Part of the flattened opening 15 appears as the joint face 14 shown in FIG. 3. The crank billet 29 is then heated to the required temperature and placed in the lower metal mold 36, after which pressure is applied from an upper metal mold 37 to perform forging. As a result of this hot forging, the length, overall thickness, wall thickness, and surface of the crank arm are precisely worked, the material of the crank billet 29 is tempered and homogenized, and the mechanical strength is increased.

Because the mold core 24 produced by this hot forging is still inside the crank billet 29 during the forging, the cavity 7 is not crushed. The pedal attachment hole 6 then may be made by drilling with a drill 33. Since this drilled pedal attachment hole 6 communicates with the opening 15, the removal of the mold core sand from the opening 15 forms the cavity 7. After this, the left crank 1 is completed by being machined to the shape shown in FIGS. 1 through 5.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. Thus, the scope of the invention should not be limited by the specific structures disclosed. Instead, the true scope of the invention should be determined by the following claims.

What is claimed is:

1. A crank arm for a bicycle comprising:

a one-piece cast crank arm body having a pedal attachment hole on a first end thereof and a spindle attachment hole on a second end thereof, wherein the crank arm body defines an elongated interior cavity, and wherein the interior cavity is open to an exterior of the crank arm body.

2. The crank arm according to claim 1 wherein the interior cavity opens into the pedal attachment hole.

3. The crank arm according to claim 2 wherein the first end of the crank arm body has an interior joint.

4. The crank arm according to claim 1 wherein the interior cavity has a substantially semicircular cross sectional shape in proximity to the spindle attachment hole.

5. The crank arm according to claim 1 wherein the interior cavity has a substantially rectangular shape in proximity to the pedal attachment hole.

6. The crank arm according to claim 5 wherein the interior cavity has a substantially semicircular cross sectional shape in proximity to the spindle attachment hole.

7. The crank arm according to claim 1 wherein a cross sectional area of the cavity decreases from a central portion of the crank arm body to the first and second ends of the crank arm body.

* * * * *